T. B. WILLIAMS & F. L. SMITH.
FACING TOOL FOR DRESSING VALVE SEATS, &c.
APPLICATION FILED JAN. 23, 1915.
1,227,511.
Patented May 22, 1917.
3 SHEETS—SHEET 1.
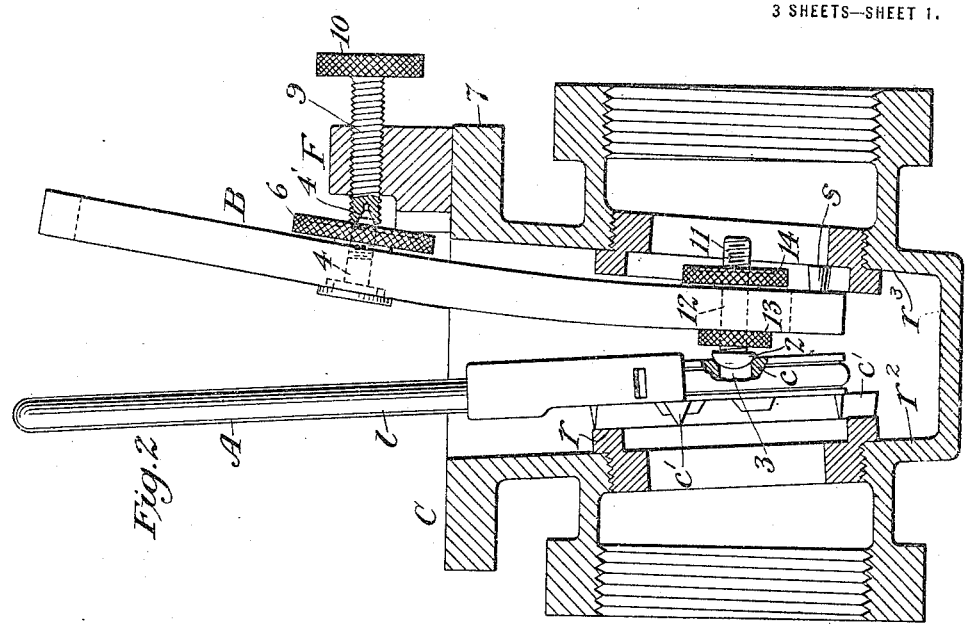
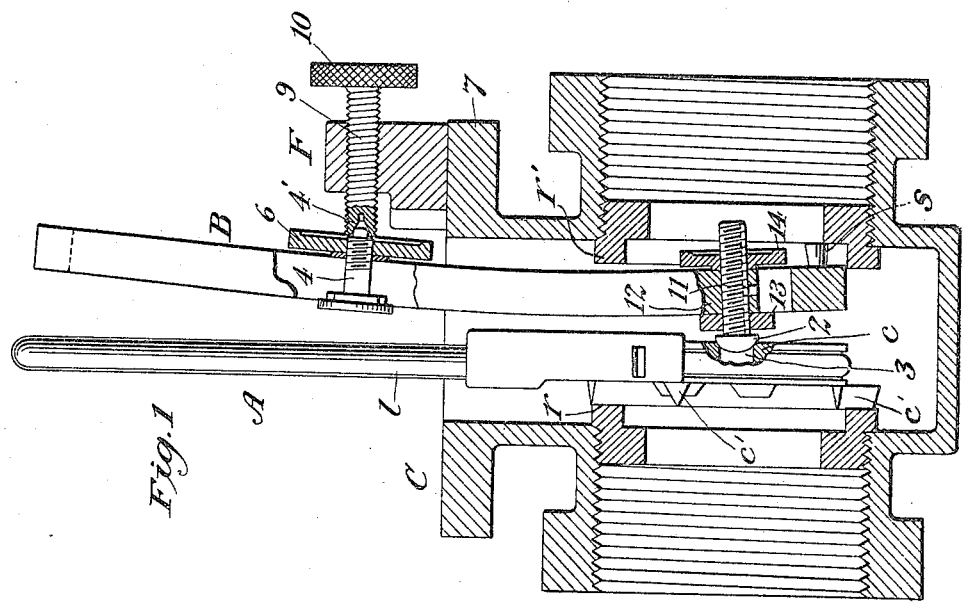
Witnesses:
Chas. D. King
John H. Jones
Inventor:
Thomas B. Williams
and Frank L. Smith,
by
Attorney.

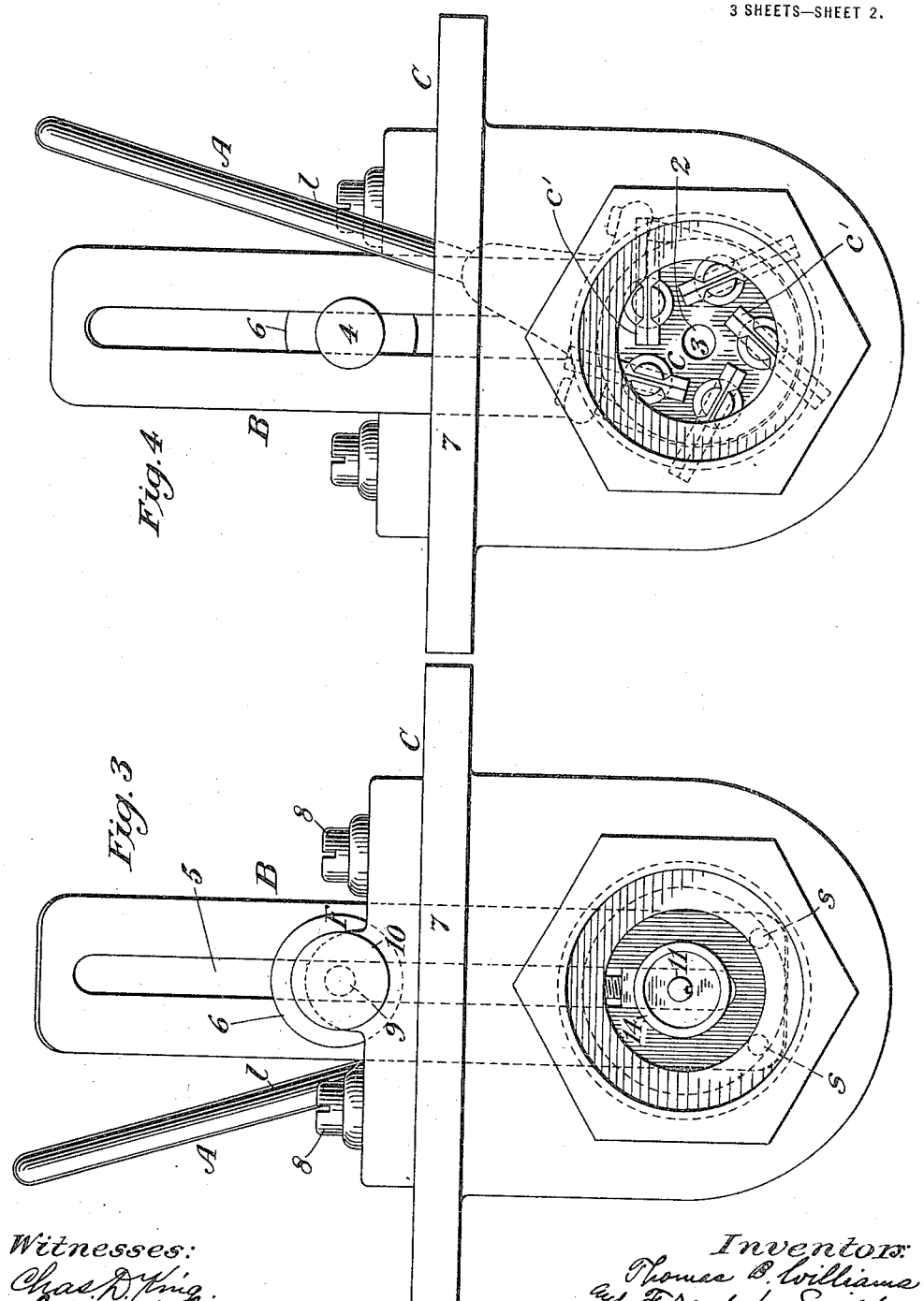

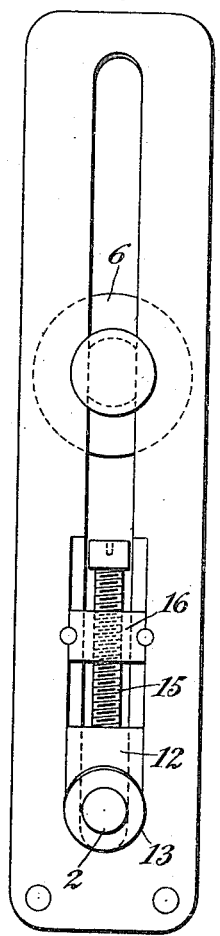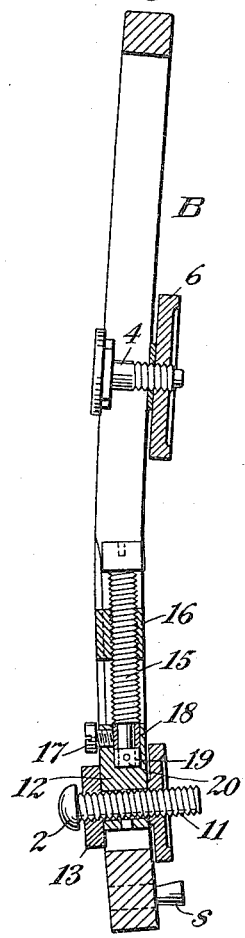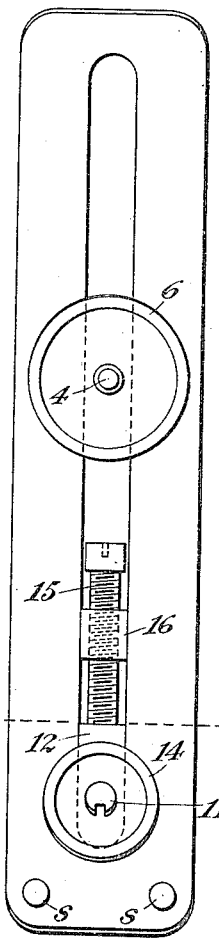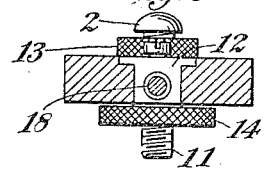

UNITED STATES PATENT OFFICE.

THOMAS B. WILLIAMS, OF ORANGE, MASSACHUSETTS, AND FRANK L. SMITH, OF CHICAGO, ILLINOIS, ASSIGNORS TO THE LEAVITT MACHINE COMPANY, OF ORANGE, MASSACHUSETTS, A CORPORATION OF MASSACHUSETTS.

FACING-TOOL FOR DRESSING VALVE-SEATS, &c.

1,227,511.

Specification of Letters Patent.

Patented May 22, 1917.

Application filed January 23, 1915. Serial No. 3,897.

*To all whom it may concern:*

Be it known that we, THOMAS B. WILLIAMS and FRANK L. SMITH, citizens of the United States, and residents, respectively, of Orange, in the county of Franklin and State of Massachusetts, and Chicago, in the county of Cook and State of Illinois, have invented certain new and useful Improvements in Facing-Tools for Dressing Valve-Seats, &c., of which the following is a specification.

This invention relates to a facing tool for dressing valve-seats, etc., and particularly to a tool adapted for recutting valve-seats, etc., that have become worn or pitted as a result of long use, this class of tools being of a type especially adapted for attachment to a valve-casing and refacing a valve-seat in a pipe line or other location, *in situ*.

The patent to Morse, No. 429,939, granted June 10, 1890, is representative of the type of tools for recutting valve-seats, etc., in which the tool is attachable to a fixed point, to wit, a valve-casing, for the purpose of recutting the valve-seat without removing the same. In this type of tool for recutting valve-seats, etc., *in situ* the tool is attached to one fixed point or surface and the cutter operates upon another fixed point or surface, but the tool as a whole extends in the general direction of the axis of the cutter and is not located between these two fixed points or surfaces. The principal object of this invention is to provide an improved facing tool of this general type in which the tool as a whole when in use will be disposed substantially between two such resistance points or surfaces and will extend in a general direction transverse to the axis of the cutter instead of lengthwise of such axis. Many important adavantages which will hereinafter specially appear result from this radical modification of the Morse type of valve-reseating machine attachable to fixtures for refacing valve seats, etc., *in situ*. Chief among these are the reduction of width and simplification of construction and operation, the former of which features adapts the new type of facing tool to various uses to which the older type could not be put or could be put only with difficulty, and the latter of which renders the use of the tool by comparatively inexperienced persons easy, especially in connection with the facing of valve-seats of gate-valves, for which work the tool of the present invention is especially adapted and intended.

In two prior patents granted to us, No. 1012926, dated Dec. 26, 1911 and 1028295, dated June 4, 1912, there is disclosed a type of facing tool designed more particularly for facing valve-seats, etc., of pump and gate-valves. The tool of each of these patents embodies as its main features a rotary cutter having a multiplicity of cutting edges lying in a common plane and operating with a scraping action and a universal connection between such cutter and actuating means for the same. Both of these types of tools have given good results commercially in refacing seats, etc., of pump and gate-valves. The former, however, is of the same general type as the facing machine of the original Morse patent aforesaid, that is, the general direction of its main parts including its operating shaft is lengthwise of the axis of the cutting tool. The latter, while it differs from the Morse type, in having its parts disposed in a general direction transverse to the cutting axis, does not work between two resistance points or surfaces lying outside the tool itself, its cutting action being due to the reaction between one fixed point or surface outside the tool (to wit, the valve-seat to be dressed) and a fixed point in one of the main elements of the tool.

The tool of the present invention differs radically from the tools of these three patents in that it is a tool which in use extends in a general direction transverse to the cutting axis instead of longitudinally of it, and is also disposed substantially between two resistance points or surfaces, such as a pair of valve-seats, so as to work substantially as a whole between these two resistance points or surfaces lying outside of the main members of the tool itself.

Another of the chief features of this invention is the provision of means adapting a tool of this new species not only to the facing *in situ* of parallel gate-valve seats, but of seats inclined at an acute angle to each other; and this result is preferably obtained by the utilization of the principle disclosed in our aforesaid patents, to wit, a universal connection between the two main members of the present tool. By employing such a connection a tool results that is capable of working between gate-valve seats and facing them properly, whether said seats are parallel or at an acute angle to each other. When in use it is disposed between two resistance surfaces wholly outside these members, usually between said valve-seats, and coöperates properly therewith at various angles made by said surfaces to each other; and moreover such a tool may be not only located between two such surfaces and then wedged in place and spread to cut one surface, but may be removed, reversed and the same operation repeated to reface the other surface.

In the foregoing the main features that distinguish the tool of the present invention from all others with which we are familiar that have preceded it are set forth. Various more specific features of the present invention will be hereinafter set forth in detail and are illustrated in the accompanying drawings, in which, Figure 1 is a sectional edge elevation of a facing tool embodying the invention in operative relation with a pair of parallel valve-seats;

Fig. 2 is a similar view of the same tool in operative relation with a valve-casing having a pair of valve-seats disposed at an acute angle with each other;

Fig. 3 is an end elevation of the device shown in Fig. 1 looking from the right in said figure toward the cutter-bar of the tool;

Fig. 4 is a similar view looking from the opposite end of the same toward the face of the cutter;

Fig. 5 is an elevation of the cutter-bar and parts carried thereby looking at the face of said bar;

Fig. 6 is a similar view looking at the opposite face of the cutter-bar;

Fig. 7 is a substantially central longitudinal section of the same looking at the edge thereof, and Fig. 8 is a transverse section of the same taken substantially in line 8—8, Fig. 6.

Similar characters designate like parts in all the figures of the drawings.

As before stated, one of the main features that distinguishes the facing tool of the present invention from those of the art is the provision of a tool so constructed that its general direction is crosswise instead of lengthwise of the axis of its cutter and it is adapted to work between two opposed resistance points or surfaces outside the tool, that is to say, it is so constructed that the tool as a whole may be introduced between two such surfaces and perform its functions while disposed substantially transversely to said cutting axis. The tool embodies two main elements connected for relative cutting movement, one of them being in the preferred construction a rotary cutter movable about an axis passing substantially through the centers of the opposed resistance surfaces or valve-seats with which the tool is intended to coöperate. The preferred construction is one in which this rotary cutter is a ratchet-feed device and has an intermittent rotary movement due to oscillation of the lever of the ratchet-feed device. In this respect the device is similar to that of our prior patent aforesaid, No. 1028295. The cutter, as before stated, is also preferably of the same general type as that shown in said patents, that is to say, it is one in which there is a multiplicity of cutting edges or cutters proper, the edges of which lie in a common plane transverse to the axis of movement of the ratchet-feed cutter. The other main member of the tool coöperates with the first element just described and is preferably so associated with it, as by means of a universal connection, that these two main elements may be readily associated and separated by the mere insertion of one element of a universal joint into, and its removal from, the other element of such joint. One of the principal functions of this other main element of the facing tool is to locate the cutter in such a manner as to establish and maintain the position of the cutting axis, and this result is accomplished by suitably attaching said element to one of said opposed resistance points or surfaces in a manner analogous to the attachment of the tool of said original Morse Patent No. 429,939, to a valve-casing. There are two principal differences, however, in the manner in which this connection is made in the present case when compared with the connection made in the case of said patent. Here this second main element of the tool is preferably readily detachable from the casing at all times if moved in the proper direction and is located by contact only and not by engagement of screw threads with corresponding threads or their equivalent on the casing, and it is also located, together with the surface or valve-seat to which it is connected, in a general direction transverse to the axis of the valve-casing in addition to such general direction being transverse to the cutting axis. In the types of valve-casing shown and with which this tool is particularly adapted to coöperate, the cutting axis and the longitudinal axis of the valve-casing are either coincident or substantially so, instead of being at a right angle to each other, as in the valve-casings of the type shown in said Morse patent.

The two main elements of the present tool may be of any suitable construction coming within the foregoing disclosure. They are preferably a ratchet-feed cutter of any suitable type, such as A, and a cutter-bar, preferably a cutter-support, in the form of a lever, such as B. In the preferred construction these two main elements of the tool will have a face-to-face connection permitting ready connection and disconnection thereof. This connection will usually be such as to permit one of these main elements to be inserted in the opening between a pair of valve-seats in a casing-head in advance of the other and the second member afterward inserted and the complementary bearing elements properly associated. Here these main elements have complementary ball-and-socket elements, 2 and 3, of a universal connection which permits the proper relative location of the elements A and B by merely inserting the ball part 2 into the socket 3 after the two elements have been located substantially in working position between the opposed valve-seats, such as $r$ and $r'$, of the valve-casing, C. It will be obvious that such a universal connection as this will permit the same relative tipping of the parts to enable the cutting edges to face surfaces at varying angles that results from the type of universal connection shown in our aforesaid patents.

The element A is preferably a ratchet-feed cutter comprising a lever, $l$, a cutter proper $c$, and a ratchet-feed connection between the lever $l$ and the cutter $c$, for converting an oscillating movement of the lever about the cutting axis into a step-by-step rotation of the cutter proper. The cutter $c$ has a multiplicity of cutting blades or cutters proper, $c'$, so constructed and so disposed about the axis of the cutter $c$ as to operate upon the surface to be faced with a scraping rather than a cutting action, as set forth in our aforesaid patents. The specific features of novelty of this ratchet-feed cutter constitute the subject matter of a separate application filed by us January 23, 1915, Serial No. 3900, and will not be described in detail herein.

The other main element B is here shown as constructed preferably in form of a bar to facilitate its insertion down into the valve-casing C to the desired point, and its proper manipulation to bring it to the working position in operative relation with the other main element A. The construction shown is one in which this bar forms a support for the cutter, it carrying the ball-head 2 which goes into the socket 3 in the inner face of the cutter $c$. This cutter-bar as illustrated constitutes a lever the fulcrum of which is a point of contact with the resistance surface or valve-seat with which it coöperates. The two members A and B are intended to lie and work between the resistance points or surfaces $r$ and $r'$ and to have such a relative movement toward and from each other as to be readily releasable from said surfaces $r$ and $r'$ as well as movable into clamping engagement therewith, this being due to a relative spreading of these two main parts and their consequent reaction against the opposed resistance surfaces between which they work. The fulcrum-point of the lever B is substantially at the lower end of the outer face thereof, that is, it is the point of contact of said lever with the corresponding resistance point or surface $r'$. This lever is intended not only to support the cutter, but also to perform other important functions, one of the principal ones being that of feeding said cutter up to the work, that is, against the valve-seat $r$. (See Fig. 1). This feeding movement is in the present case intended to be a slow and gradual swinging movement of the lever B about its fulcrum toward the left in Fig. 1. This feed movement may be produced in many ways. Here it results from the employment of a suitable feed device, such as F, coöperative with the lever B at the power-point of the latter. In the present construction this power-point is in an element adjustable lengthwise of the lever B, the element shown being an adjustable screw-stud, such as 4, movable in a main guide-slot, 5, preferably extending substantially from end to end of the lever or cutter-bar B, said screw-stud being intended to be clamped in place in any adjusted position lengthwise of the part B, as by means of the usual knurled clamp-nut, 6. The extreme outer end of the screw-stud 4, indicated at 4', constitutes the power-point of the lever B to which pressure is applied for imparting a feed movement to the lever and through it to the cutter $c$ to feed the latter as the cutting members $c'$ take their chips. Any suitable feeding means may be employed to coöperate with the power-point 4' of the lever B, the means shown being the feed device F, preferably detachably connected to the flanged portion, 7, of the valve-casing C in a well-known manner, as by clamp-screws, 8. The main element of the feed device shown is a feed-screw, 9, having a knurled head, 10, and a cupped inner end for coöperation with the power-point, 4', of the lever B. The adjacent surfaces of this power-point and the feed-screw are so shaped as to coöperate properly in all relative positions of the parts, that is, at all angles which they may make as the feed progresses; and it will also be clear that because they make end contact the feed device and the tool, considered as a whole, are as readily separable as are the two main elements A and B of the tool proper by disconnection at the ball-joint 2—3. The principal object of providing for adjustment of the position of the power-point of the lever B in the manner just described is to enable the lever to coöperate properly with surfaces, that is, valve-seats, of different diameters, it being obvious that some adjustment for this purpose will be necessary in any tool adapted to operate on valve-seats differing considerably in diameter. The adjustment shown provides for a considerable range of action of the tool.

As before stated, one element of the pivotal connection between the two main elements A and B is carried by the cutter-bar or lever B near the lower end thereof, that is, near the fulcrum of said lever. The load-point of said lever B is in this pivotal element and hence said lever is one of the second order. For the same reasons just set forth in connection with the power-point of the lever, it is also desirable to provide for shifting the load-point of the lever; and in the construction illustrated this is accomplished in a manner similar to that described in connection with the power-point. Here the ball element 2 of the pivotal or universal connection between the parts A and B is at the inner end of a screw-post, 11, which is slidable through a slide-block, 12, movable up and down in the guide-groove 5 of the lever B near the lower end thereof. This slide-block may be held in place and may be constructed in any suitable way (see Figs. 1 and 8) it being substantially T-shaped in cross-section and suitably bored to receive the screw-post 11, which is splined in place in the bore to prevent turning. This post in turn has a pair of knurled nuts, 13 and 14, on it which with said post control another important function of the tool, to wit, the preliminary relative adjustment of the two main elements A and B at the proper distance apart for coaction with valve-seats, etc., such as $r-r'$, spaced at different distances apart. It will be obvious that without such provision for adjustment of one element of the pivotal or universal connection relative to the other transverse to the tool, so as to separate the main members A and B thereof more or less in accordance with the requirements, the tool would not have any considerable range of action in this respect. By properly adjusting the nuts 13 and 14 the screw-post 11 with its ball-head 2 may be located in any desired position transversely of the cutter-bar B and locked in that position by jamming the nuts 13 and 14. The vertical adjustment of the ball-head and screw-post, that is, the adjustment lengthwise of the lever B, may be effected in any suitable manner, as, for example, by a screw, 15, located in the lower part of the guide-way 5 and threaded through an opening in the fixed cross-bar, 16, of the lever B, the lower end of said screw 15 being shown as operative for raising and lowering the slide-block 12 and the ball-head carried thereby. This slide-block and ball-head may be adjusted to and held in any desired vertical position by properly turning the screw 15 which serves with the cross-bar 16 (and the connection between the lower end of the screw 15 and the slide-block) to hold it in any position to which it may be moved. The particular means illustrated for connecting the feed-screw 15 and the slide-block 12 comprises a set-screw, 17, passing transversely through the upper inner wall of the slide-block 12 and into engagement with a short sleeve, 18, surrounding and free to turn on the reduced lower end, 19, of the screw 15, a stop-collar being shown at 20 pinned to the lower end of said feed-screw to maintain the connection between said screw and slide-block while permitting relative turning of the screw.

The devices just described may be varied considerably but they constitute simple and effective means for shifting the load-point and the power-point of the lever to permit a considerable range of action of the tool with valve-seats of various diameters, and for also effecting changes in the relative positions of the main elements A and B of the facing tool so as to space them farther apart or closer together to enable them to coöperate with valve-seats $r$ and $r'$ spaced at different distances apart.

The element B of the tool is located in one direction by contact of its outer face with the surface $r'$, that is to say, by engagement, in the construction shown, of the lever B with a resistance surface at the fulcrum-point of the lever. It is also necessary to locate this element transversely of the cutting axis, and preferably to locate it in such a manner that it will have no tendency to turn about said axis. This result may be accomplished in various ways. Here the positioning of the bar B lengthwise results from the use of one or more stop-pins, such as $s$, which project outwardly from the element B near the lower end thereof, and are adapted to engage the circular inner wall of the valve-seat. Two of these stop-pins are preferably used, as shown in Fig. 6, and these preferably coöperate with a third point at the opposite side of the cutting axis, which third point in this case is at the power-point 4' of the lever. Thus there are three fixed points of location for preventing lengthwise movement of the element B and also for preventing relative turning movement of the same about the cutting axis, these three points being located at the corners of a triangle. By means of these three elements for locating the bar in a direction transverse to and circumferentially of the cutting axis and the contacting faces at the fulcrum-point of the lever, the element B is located against movement in every direction except toward the cutter, and movement in that direction is intended to take place (after the parts have been set in position between the surfaces $r$ and $r'$) only as a result of the inward advance of the part B turning about its fulcrum as a result of the application of power near the upper end thereof.

In Fig. 2 there is illustrated a modification of the type of valve-casing shown in Fig. 1 in which the valve-seats to be faced ($r^2$ and $r^3$) instead of being parallel are located at a considerable acute angle with respect to each other. The universal connection between the two main elements A and B of the facing tool permits the tipping of these elements to a different angular relation, as will be seen, and in this relation the parts will coöperate properly to face the valve-seats. When used to reface valve-seats disposed at an acute angle, however, it is desirable to employ, as the element B, a bar that diverges at its upper end from the element A and also diverges at its upper end from the lower end of B. In the construction illustrated a bar having a convex surface facing the element A is shown, as such a bar is adapted to both parallel and acute-angular valve-seats. The stop-pins $s$ are also preferably tapered inwardly in order that they may grip the circular inner walls of the valve-seats properly in all angular positions of the elements A and B, as it has been found in practice that they do not coöperate so well in all positions if they are plain cylindrical pins.

A facing tool such as that hereinbefore described is, as will be evident, adapted for operation in spaces where it would be impossible to use a facing tool of the type which has all of its main parts disposed in the general direction of the cutting axis of the tool. In addition to this it will be clear that the tool is a simple one capable of being readily and properly manipulated by inexperienced operators to resurface valve-seats, etc., of various diameters and disposed in various angular positions at various distances apart (within the limits of the tool). Whatever the particular conditions within the range to which the tool is applicable, its general direction is always transverse to the cutting axis, and the cutting action results from relative movement substantially in the direction of that axis, and is due to reaction of relatively movable elements on two resistance points or surfaces lying wholly outside the tool. Furthermore, it will be clear that the construction of the tool is such that it is reversible, so that when, for example, the seat $r$ or $r^2$ has been properly faced by reaction of the parts between opposed resistance surfaces, the tool may be removed, inserted again in the valve-casing in the reverse position and the refacing of the surface $r'$ or $r^3$ effected by bringing the cutting edges $c'$ into engagement with one or the other of said valve-seats.

What we claim is:

1. A valve reseating tool comprising a facing cutter and a cutter support, the former of which is mounted on one side only of the cutter support to have a turning movement relative thereto and is freely separable therefrom by relative movement of the engaging surfaces, and means on the cutter for operating the same.

2. A valve reseating tool comprising two elements having a universal connection, one of which elements is a cutter support and the other of which is a facing cutter, and means on the cutter for operating the same.

3. A tool of the class described constructed to engage and work between two opposed resistance points outside the tool and including a cutter and a cutter support, a pivotal connection between the cutter and cutter support which permits the pivotal movement of the former on the latter and the bodily movement of the same toward and away from the latter.

4. A tool of the class described constructed to engage two opposed resistance points outside the tool and comprising two main members—one of which is a cutter—having a universal connection one element of which is movable in a direction to vary the distance between said main members.

5. A tool of the class described constructed to engage two opposed resistance points outside the tool and comprising two main members—one of which is a cutter—having a universal connection, and means for adjusting and holding one element of said connection to vary the distance between said main members.

6. A tool of the class described constructed to engage two opposed resistance points outside the tool and comprising two main members—one of which is a cutter—having a universal connection, a post carried by and disposed transversely to one of said members and carrying one element of said connection, and means for adjusting and holding said post transversely of said member to vary the distance between said main members.

7. A tool of the class described constructed to engage two opposed resistance surfaces outside the tool and comprising two main members—one of which is a rotary cutter—adapted to engage one of said surfaces with a multiplicity of cutting edges disposed about the axis of the cutter and lying in a common plane, said members having a universal connection permitting a relative cutting movement, and means for adjusting the position of said universal connection to vary the distance between said main members.

8. A tool of the class described constructed to engage, and work between, two opposed resistance points outside the tool and comprising a cutter, a cutter-support freely separable therefrom, means for adjusting the relative distance between said cutter and cutter-support, and means for imparting feed movement to the adjusted cutter.

9. A tool of the class described constructed to engage two opposed resistance points outside the tool and comprising a rotary cutter and its operating means, a cutter-bar freely separable therefrom near one end of which said cutter and its operating means are pivoted, and means near the other end of said cutter-bar for imparting feed movement to the cutter.

10. A tool of the class described constructed to engage two opposed resistance points outside the tool and comprising a rotary cutter, a cutter-bar near one end of which said cutter is pivoted, means adjacent to said pivot for adjusting the relative distance between the cutter and the cutter-bar, and means for imparting feed movement to the adjusted cutter.

11. A tool of the class described constructed to engage two opposed resistance points outside the tool and comprising a cutter, a cutter-support, means for adjusting the relative distance between said cutter and cutter-support, and means for simultaneously moving said cutter and cutter-support to impart a feed movement to the adjusted cutter.

12. A tool of the class described constructed to engage two opposed resistance points outside the tool in the cutting zone, and comprising a cutter, a lever on which said cutter is supported for rotation, and a feed device for varying the position of the power-point of said lever while the tool is in engagement with both of said resistance points.

13. A tool of the class described constructed to engage two opposed resistance points outside the tool and comprising a cutter, a lever on which said cutter is supported for rotation between the fulcrum and power points of said lever, and a feed device for varying the position of the power-point of said lever.

14. A tool of the class described constructed to engage two opposed resistance points outside the tool in the cutting zone, and comprising a cutter, a lever on which said cutter is supported for rotation and having a power-point adjustable along said lever, and a feed device coöperative with said power-point and controlling the application of power to said lever for feeding said cutter while the tool is in engagement with both of said resistance points.

15. A tool of the class described constructed to engage two opposed resistance points outside the tool in the cutting zone and comprising a cutter, a lever operative for moving said cutter up to the work and having a shiftable power-point, and a feed device coöperative with said lever at said power-point in all working positions of the latter while the tool is in engagement with both of said resistance points.

16. A tool of the class described constructed to engage two opposed resistance points outside the tool and comprising a cutter, a lever operative for moving said cutter up to the work and having a load-point shiftable thereon, and a pivotal connection between said cutter and lever and located always at the load-point of the latter.

17. A tool of the class described constructed to engage two opposed resistance points outside the tool and comprising a cutter, a lever operative for moving said cutter up to the work and having a load-point shiftable thereon, and a universal connection between said cutter and lever and located always at the load-point of the latter.

18. A tool of the class described constructed to engage two opposed resistance points outside the tool and comprising a cutter, a lever operative for moving said cutter up to the work and having power and load points shiftable thereon, a universal connection between said cutter and lever at said load-point, and a feed device coöperative with said lever at said power-point.

19. A tool of the class described constructed to engage two opposed resistance points outside the tool and comprising two main members—one of which is a rotary cutter—having a pivotal connection one element of which is movable in two directions to vary the distance between said main members and to change the position of the cutting center.

20. A tool of the class described constructed to engage two opposed resistance points outside the tool and comprising two main members—one of which is a rotary cutter—having a universal connection one element of which is carried by said cutter and the other element of which is carried by said other main member and is movable in two directions thereon to vary the distance between said main members and to change the position of the cutting center.

21. A tool of the class described constructed to engage two opposed resistance points outside the tool and comprising two main members—one of which is a rotary cutter—having a universal connection one element of which is carried by said cutter and the other element of which is carried by said other main member and is movable in two directions thereon to vary the distance between said main members and to change the position of the cutting center, and means on said main member for moving said element of the universal connection in said two directions.

22. A tool of the class described constructed to be spread between and engage the plane faces of a pair of opposed annular valve-seats, said tool comprising a rotary cutter and an associated cutter-bar, the former of which is movable about its axis relatively to the other and the latter of which has an outwardly projecting tapering stop-pin for engaging the circular inner edge of a valve-seat and locating the cutter-bar lengthwise in any angular relation of the cutter and cutter-bar, and means for varying the angular relation between the outer faces of said cutter and cutter-bar.

23. A tool of the class described constructed to be spread between and engage the plane faces of a pair of opposed annular valve-seats, said tool comprising a rotary cutter and an associated cutter-bar, the former of which is movable about its axis relatively to the other and the latter of which has a plurality of outwardly projecting stop-pins spaced apart for engaging the circular inner edge of a valve-seat at separated points and preventing turning of the cutter-bar about said axis.

24. A tool of the class described constructed to be spread between and engage the plane faces of a pair of opposed annular valve-seats, said tool comprising a rotary cutter and an associated cutter-bar, the former of which is movable about its axis relatively to the other and the latter of which has a plurality of outwardly projecting tapering stop-pins spaced apart for engaging the circular inner edge of a valve-seat at separated points and preventing turning of the cutter-bar about said axis in any angular relation of the cutter and cutter-bar, and means for varying the angular relation between the outer faces of said cutter and cutter-bar.

25. A tool of the class described constructed to be spread between and engage a pair of opposed plane surfaces whether said surfaces are parallel or at an acute angle with each other, said tool comprising a rotary cutter and an associated cutter-bar disposed face-to-face, the former of which is movable about its axis relatively to the other and the latter of which has its inner face in two planes and shaped to diverge outwardly from the inner face of the cutter.

26. A tool of the class described constructed for attachment to three widely separated resistance surfaces outside the tool and comprising two coöperative main members located between and adapted to engage two of said surfaces in the cutting zone and a cutter-feeding device adapted to engage said third surface, one of said main members being a rotary cutter.

27. A tool of the class described constructed for attachment to three widely separated resistance surfaces outside the tool and comprising two coöperative main members located between and adapted to engage two of said surfaces in the cutting zone and a cutter-feeding device adapted to engage said third surface, one of said main members being a rotary cutter and both of said main members being disposed transversely to the axis of rotation of said cutter.

28. A tool of the class described comprising a rotary cutter and its operating means, a cutter-bar transverse to the axis of rotation of said cutter, and a ball-and-socket joint between said cutter with its operating means and said cutter-bar.

29. A tool of the class described comprising a rotary cutter and its operating means, a cutter-bar transverse to the axis of rotation of said cutter, and a ball-and-socket joint between said cutter with its operating means and said cutter-bar and separable by movement substantially in the direction of said cutting axis.

30. A tool of the class described comprising a rotary ratchet-feed cutter having an operating lever transverse to its cutting axis, a cutter-bar also transverse to the axis of said cutter, and a universal connection between said cutter and cutter-bar.

31. A tool of the class described comprising a rotary ratchet-feed cutter having an operating lever transverse to its cutting axis, a cutter-bar also transverse to the axis of said cutter, and a ball-and-socket joint connecting said cutter and cutter-bar and separable by movement substantially in the direction of said cutting axis.

32. A valve reseating tool constructed to engage two opposed resistance points outside the tool and including a freely separable facing cutter and cutter supporting lever having a pivotal connection therebetween, and means on the cutter for operating the same.

33. A two-part tool constructed to engage between two opposed resistance points outside the tool and comprising a cutter and cutter supporting lever and a separable universal connection between the same, and means on the cutter for operating the same.

34. A valve reseating tool constructed to engage and work between two opposed resistance points comprising a cutter support, a facing cutter pivotally mounted thereon, and means independent of the support for actuating the cutter.

35. A tool of the class described constructed to engage and work between two opposed resistance points comprising a cutter and a cutter supporting lever, a separable pivotal connection between the cutter support and cutter and located on one side of the fulcrum of the lever, and means located on the opposite side of the fulcrum of the lever for moving the support about its point of engagement with the adjacent resistance point as a pivot to apply pressure to the cutter.

36. A tool of the class described arranged to work between two opposed resistance points and comprising a cutter and cutter support, a universal connection between said cutter and cutter support, means for supporting the cutter support at three points arranged in triangular relation to each other, and means for imparting pivotal movement to the support about a line connecting two of the points as a fulcrum.

37. A tool of the class described arranged to operate between two opposed resistance points and comprising a cutter and cutter support, a pivotal connection between the cutter and cutter support shiftable with relation to the latter, and a pressure-applying means shiftable with relation to the cutter support.

38. A tool of the class described arranged to operate between two opposed resistance points and comprising a cutter and a cutter support, means for moving said cutter support about one of its ends as a fulcrum, and means connecting the cutter and cutter support so that when the latter is moved pressure will be applied to the cutter to move it parallel with its axis of rotation.

39. In a tool of the class described constructed to engage and work between two opposed resistance points, a pivotally movable cutter bar and a cutter pivoted thereon, the cutter bar having its pivot point arranged to engage one of the resistance points and movable to vary the distance of the pivot point of the cutter from said resistance point.

40. A tool of the class described, comprising a rotary cutter, a lever pivotally associated therewith at its load point, means for varying the relative positions of the load point and fulcrum of the lever, and means for applying power to the lever and adjustable to and away from the fulcrum thereof.

41. A tool of the class described, comprising a rotary cutter, a lever pivotally associated therewith at its load point, means for varying the relative positions of the load point and fulcrum lengthwise of the lever, and means for applying power to the lever and adjustable to and away from the fulcrum thereof.

42. A tool of the class described, comprising a rotary cutter, a lever pivotally associated therewith at its load points, and means for varying the relative positions of the load point and fulcrum lengthwise and crosswise of the lever.

Signed by me, the said THOMAS B. WILLIAMS at Orange, in the county of Franklin and State of Massachusetts, this 23d day of December, A. D. 1914.

THOMAS B. WILLIAMS.

Witnesses:
 FRED A. DEXTER,
 SIDNEY J. WHITE.

Signed by me, the said FRANK L. SMITH at Chicago, in the county of Cook and State of Illinois, this fourth day of January, A. D. 1915.

FRANK L. SMITH.

Witnesses:
 GEO. H. ST. CLAIR,
 N. W. HOPKINS.

Copies of this patent may be obtained for five cents each, by addressing the "Commissioner of Patents, Washington, D. C."